Nov. 5, 1968     A. PACCIARINI ET AL     3,409,490
METHOD AND APPARATUS FOR MANUFACTURING PNEUMATIC TIRES
Filed Feb. 26, 1965     6 Sheets-Sheet 1
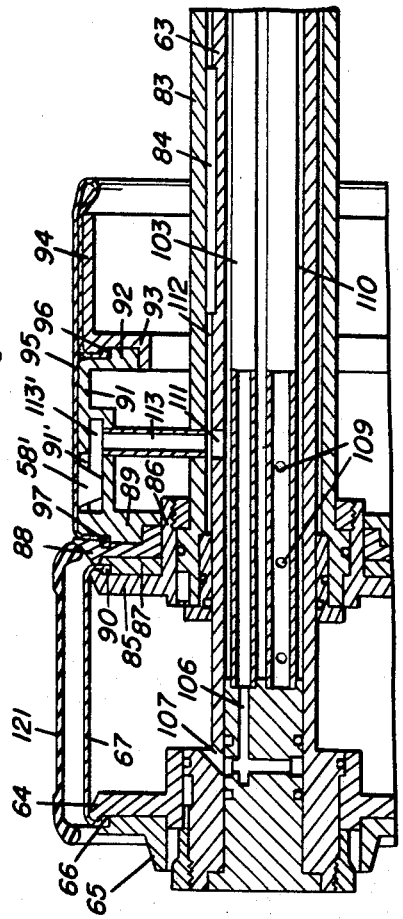
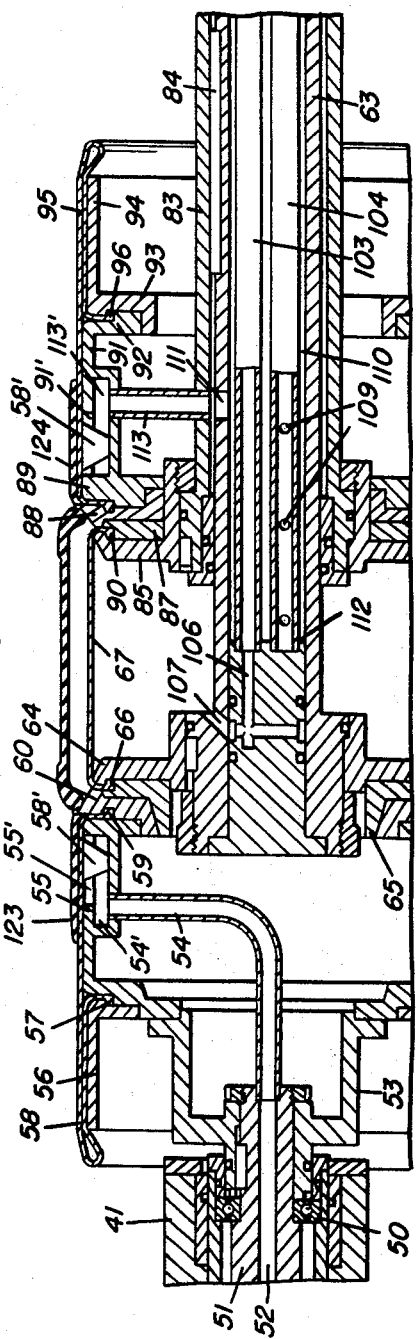
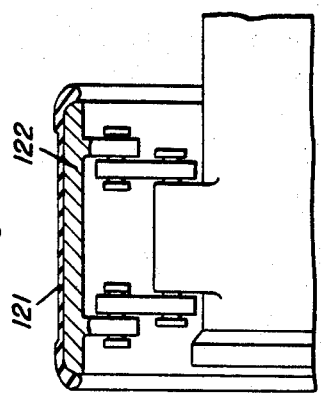
INVENTORS
*Antonio Pacciarini*
*Virgilio Lavazza*
*Dario Giletta*
BY Stevens, Davis, Miller & Mosher
ATTORNEYS

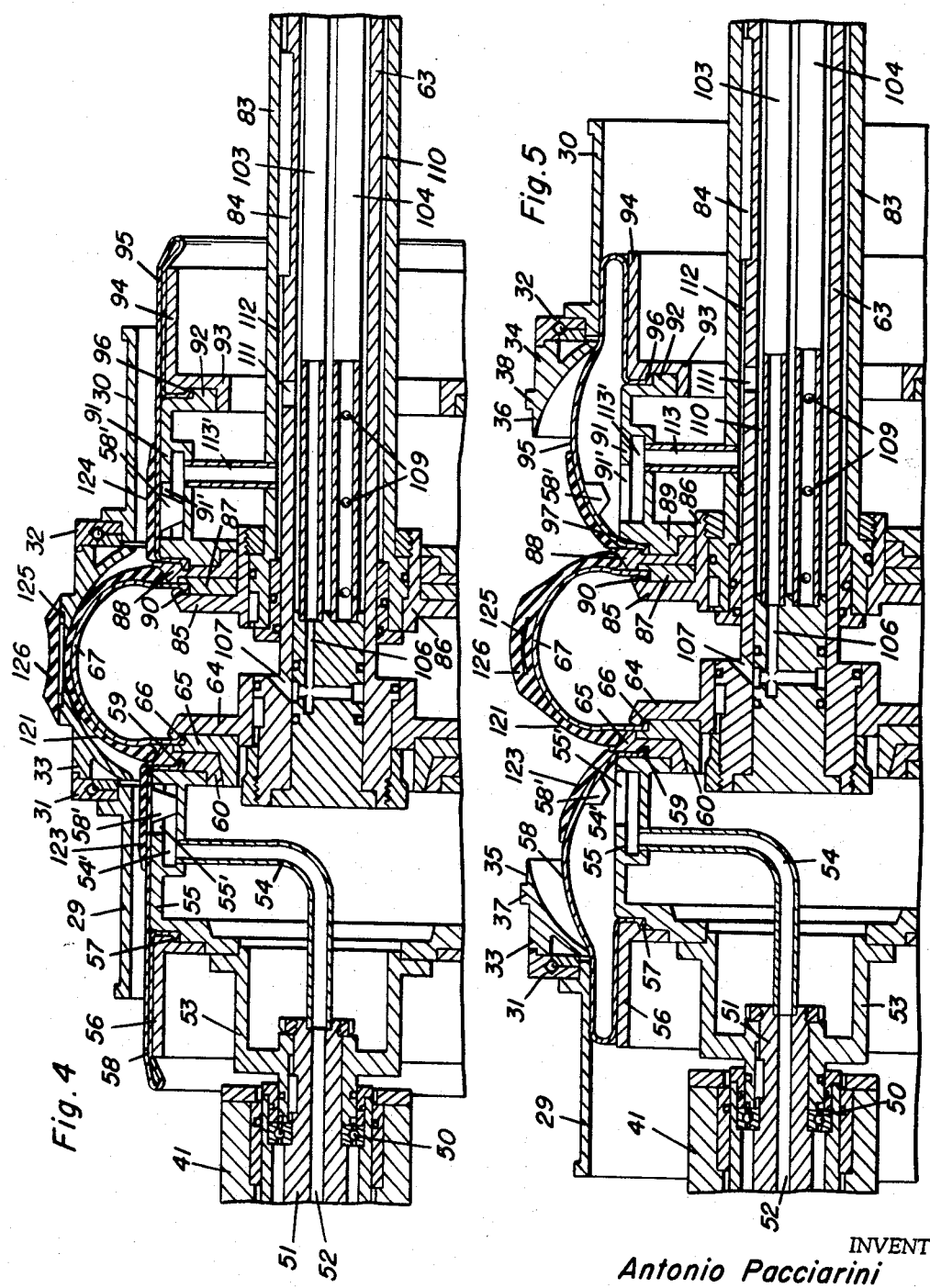

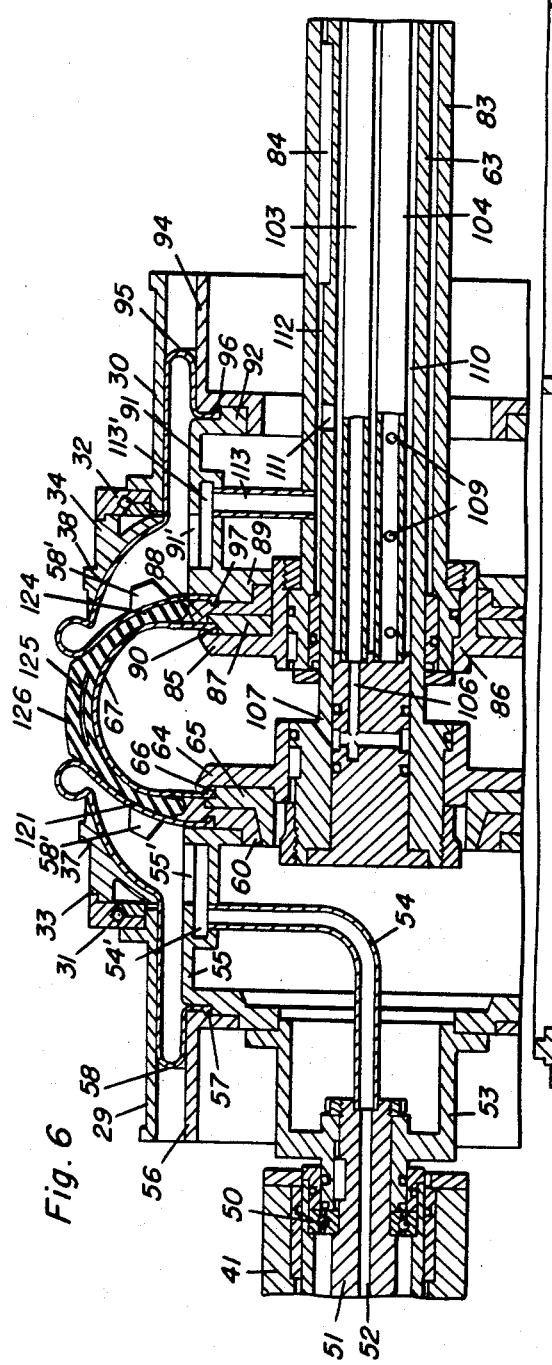
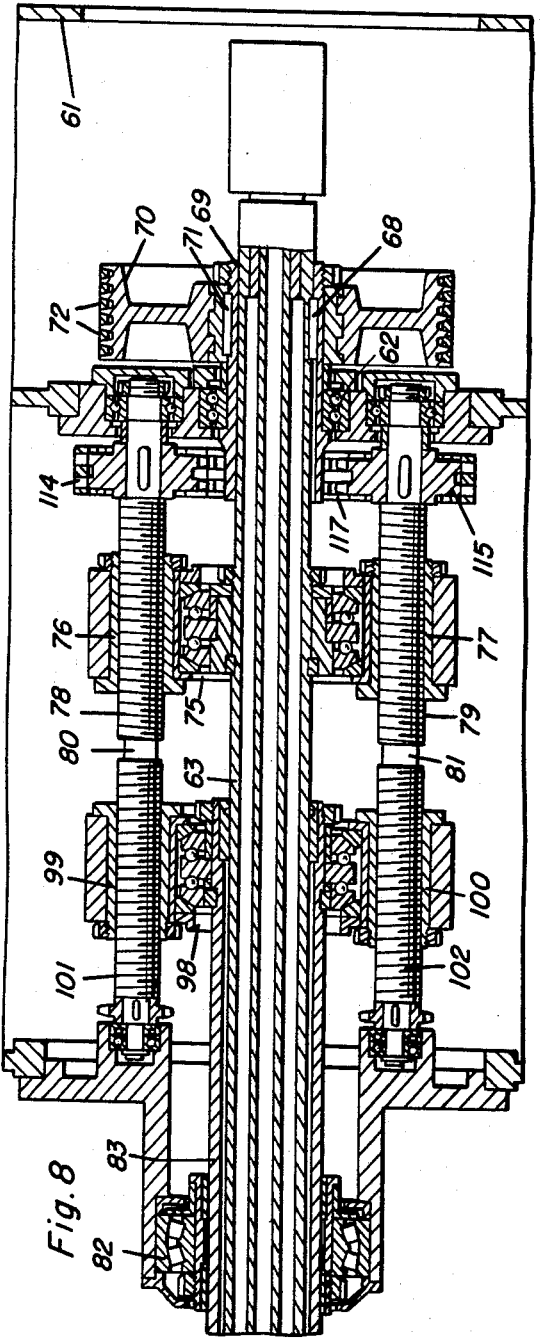

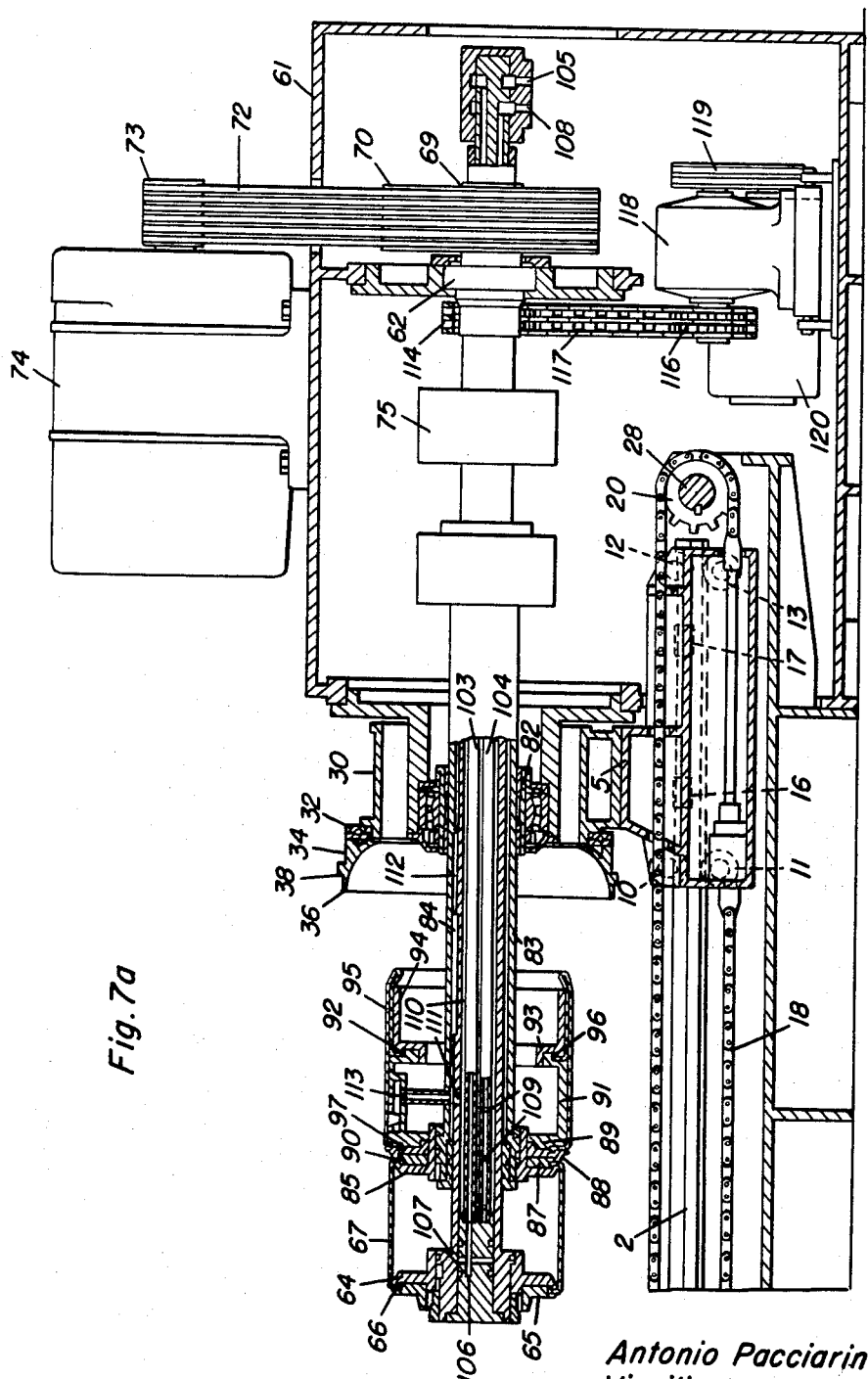

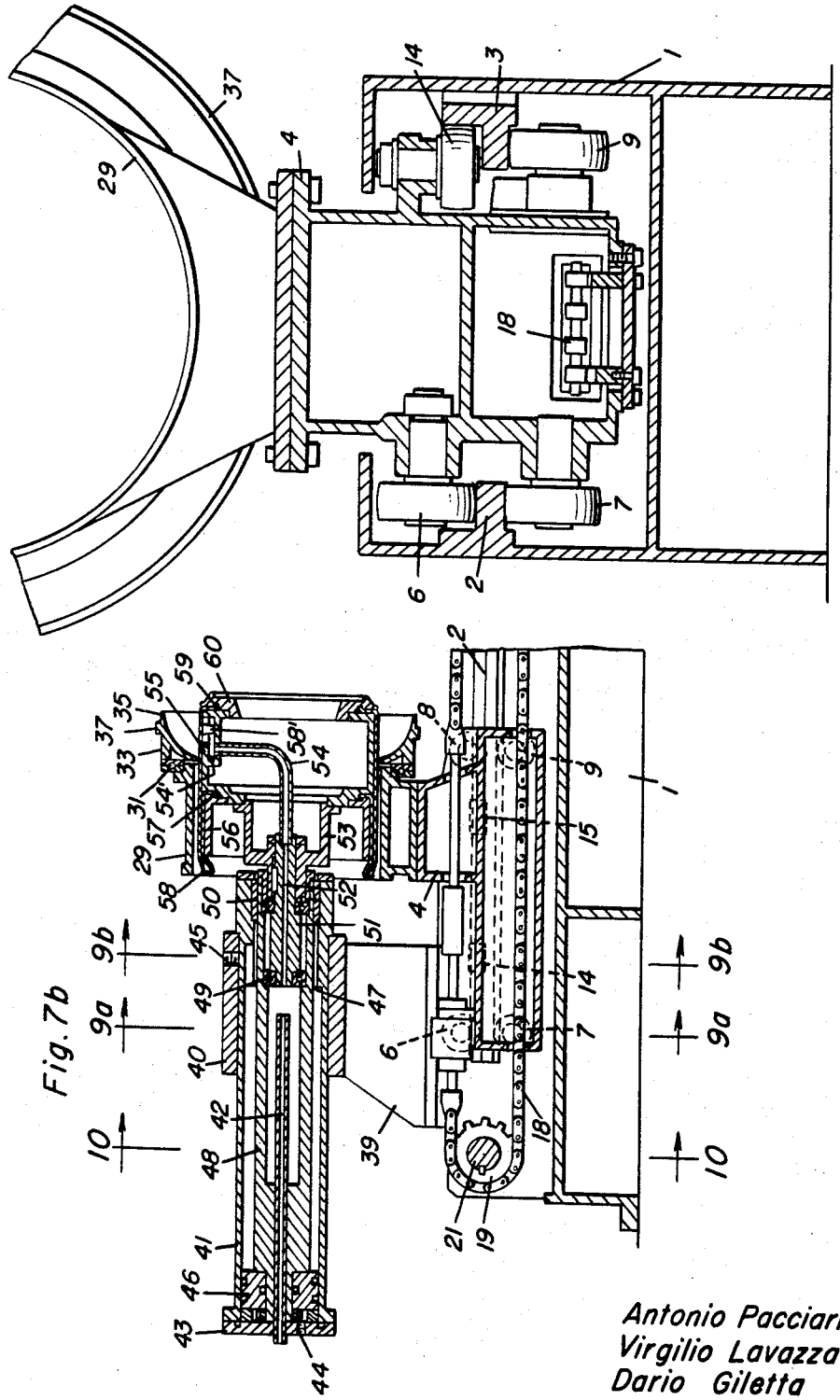

United States Patent Office

3,409,490
Patented Nov. 5, 1968

3,409,490
**METHOD AND APPARATUS FOR MANU-
FACTURING PNEUMATIC TIRES**
Antonio Pacciarini, Virgilio Lavazza, and Dario Giletta,
Milan, Italy, assignors to Pirelli S.p.A., Milan, Italy
Filed Feb. 26, 1965, Ser. No. 435,607
Claims priority, application Italy, Mar. 16, 1964,
5,633/64
36 Claims. (Cl. 156—123)

ABSTRACT OF THE DISCLOSURE

A method and apparatus for manufacturing pneumatic tires having substantially inextensible elements wherein a carcass is formed on a rigid drum, transferred to an expansible central portion of a second drum, and shaped into a toroidal form on the latter drum. A ring-shaped reinforcing structure and a tread band are then applied on the mid-circumferential portion of the carcass and a sidewall strip is applied to each side of the carcass.

---

The present invention relates to the manufacture of pneumatic tires of any size having deformable or rigid beads, provided with one or more bead cores, and substantially inextensible elements, and more particularly relates to pneumatic tires having a ring-shaped reinforcing structure disposed either between the carcass and the tread or incorporated in the tread.

As is well known to those skilled in the art, these types of tires, up to the present have been built up on machines comprising an expansible drum constituted by an elastic cylindrical membrane the outer edges of which are secured to two rigid reciprocally moveable end walls.

One of these machines is described in United States Patent No. 2,814,330. According to the method carried out by means of this machine, the carcass was initially built up on the expansible drum in cylindrical form. Then, it was brought to a toroidal shape by reciprocally and simultaneously approaching, symmetrically with respect to the drum midline, the end walls of the drum and two bells, having an outer diameter corresponding to the greatest outer diameter of the shaped carcass, and by injecting compressed air inside the drum. A ring-shaped reinforcing structure was then applied to the outer surface of the bells and was caused to adhere to the central annular band of the carcass, disposed between the edges of the bells, that faced each other slightly spaced apart. The tread band was then applied on the so formed structure. Then the bells were spread apart to make the drum accessible. Then, the reinforcing structure and the tread band were stitched on the underlying carcass. Finally, the sidewalls were applied by hand on the then pre-shaped tire and were stitched in order to cause them to intimately adhere to the sides of the latter.

This method, however, was not entirely satisfactory, primarily for the reason that the removal of the finished tire from the drum involves the ovalization of one of the tire beads to allow it to pass through the drum end walls, whose outer diameter was greater than that of the tire beads. For the same reason this method was not applicable to the manufacture of tires provided with indeformable bead cores, as in the case of large size tires.

Furthermore, the method presented certain problems which affect the quality and the uniformity of the tires obtained, for the following reasons:

(a) The manufacture of the carcass on a drum provided with an elastic membrane failed to ensure a perfect correspondence between the development of the carcass between the two beads and the pre-established development of the same;

(b) It was not possible to carry out an efficient stitching of the elements constituting the carcass since the surface of the expansible drum, when it has a cylindrical shape, is slightly yieldable, and the pressure in its inside is consequently low; and (c) The application of the strips corresponding to the two sidewalls requires a too long period of time, since it is carried out by hand on annular surfaces of decreasing diameter and moreover it is not always able to ensure a perfect symmetry of the sidewalls with respect to the mid-circumferential plane of the tire, as the application of said sidewalls depends on the skill of the operator, a highly indeterminable factor.

Because of the aforesaid problems there was the need to eliminate or materially reduce them in view of the constantly growing service requirements of vehicle tires, demanding the utmost accuracy and precision in their manufacture in order that the elements constituting these tires may be positioned symmetrically with respect to the mid-circumferential plane.

As an example of the need for true centering of the reinforcing structure and of the tread it should be noted that, in a textile reinforcing structure, an asymmetry of 5 mm. is sufficient to cause a lateral thrust of 10 kg. and that, in a metallic reinforcing structure, even an asymmetry of 2 mm. is sufficient to cause a lateral thrust of the same magnitude.

An object of the present invention is a method for the manufacture of pneumatic tires provided with substantially inextensible elements, wherein the carcass plies and the reinforcing bead cores are applied on a collapsible rigid drum, as for instance that of the machine described in the United States Patent No. 2,878,856, the edges of the plies are turned up about the bead cores and the plies, after each application on the drum, and after each turning up of their edges, are subjected to a stitching operation. The carcass so produced is transferred from the rigid collapsible drum onto a second drum provided with three tubular expansible coaxial membranes disposed side by side along the drum axis, the edges of the central membrane being reciprocally and symmetrically approachable with respect to the drum midline. Then, the carcass is brought to its final toroidal shape by correspondingly deforming the central portion of the drum and by reciprocally approaching the edges of the corresponding membrane, and at the same time enclosing the carcass being shaped within a pair of opposed bells, the outer diameter of which corresponds to the outer maximum diameter of the carcass after shaping, but leaving bells spaced apart. The ring-shaped reinforcing structure is then applied on portions of the outer surfaces of the respective bells, causing it to adhere to the midline of the carcass. Then, the tread band is applied on the assembly so formed. Next, the bells are spread apart to a pre-established position, in which they still enclose a part of the lateral membranes of the drum, after which the ring-shaped reinforcing structure and the tread band are stitched to the carcass. Then, the two lateral membranes of the drum, which are longitudinally inextensible and about which the strips of the tire sidewalls, in the form of a continuous ring, have been previously disposed, are inflated and are axially displaced towards the drum midline to reverse the strips of the sidewalls at the two sides of the carcass and to cause them to adhere to the latter by starting from the portion of smaller diameter towards the portion of greater diameter.

A further object of the present invention is a machine, constituting an improvement over that described in United States Patent No. 2,814,330 and a modification with respect to that described in United States Patent No. 3,053,-308, which has been particularly devised to carry out a second series of operations for the manufacture of pneumatic tires according to the method of the present invention so as to take into account the still growing need of obtaining tires strictly symmetrical with respect to their mid-circumferential plane, and to also achieve the maximum possible reduction in the working time. The machine comprises a drum having end members which may be reciprocally and symmetrically approached and spread apart with respect to the drum midline, and to which is tightly fastened the edge of a tubular expansible membrane, and two lateral rigid cylindrical extensions of said sides, to each of which are tightly fastened the edges of a tubular radially expansible membrane but is provided with inextensible longitudinal reinforcements resisting its extension and which surrounds the corresponding rigid extension, one of the rigid extensions of the drum sides being axially displaceable with respect to the remaining component parts of the drum, and by two rigid cylindrical supports symmetrically displaceable with respect to the drum midline, onto each of which is rotatably assembled a bell, having an outer diameter corresponding to the maximum outer diameter of the shaped carcass.

The lateral membranes of the drum, secured to the rigid extensions of the drum end walls, may be advantageously provided with a valve, which may be connected with a suction device in order to maintain one end of the tire sidewalls in the desired position during the wrapping of the latter on these membranes.

These and further features of the present invention will be more clearly apparent from the following description of one of its embodiments, given by way of example, and made with reference to the accompanying drawings, in which:

FIGS. 1 to 6 represent the various steps for the manufacture of pneumatic tires according to the method of the present invention;

FIG. 7a is a partial longitudinal vertical section of the machine principally devised for carrying out the second series of steps for the manufacture of the tires;

FIG. 7b is also a partial longitudinal vertical section of the remaining part of the machine illustrated in FIG. 7a;

FIG. 8 is a partial horizontal section on an enlarged scale of a part of the machine shown in FIG. 7a;

FIG. 9 represents in its left half a cross section of the machine of FIG. 7b, taken along plane 9a—9a, and in its right half a cross section of said machine taken along plane 9b—9b of the same figure;

Figure 10:
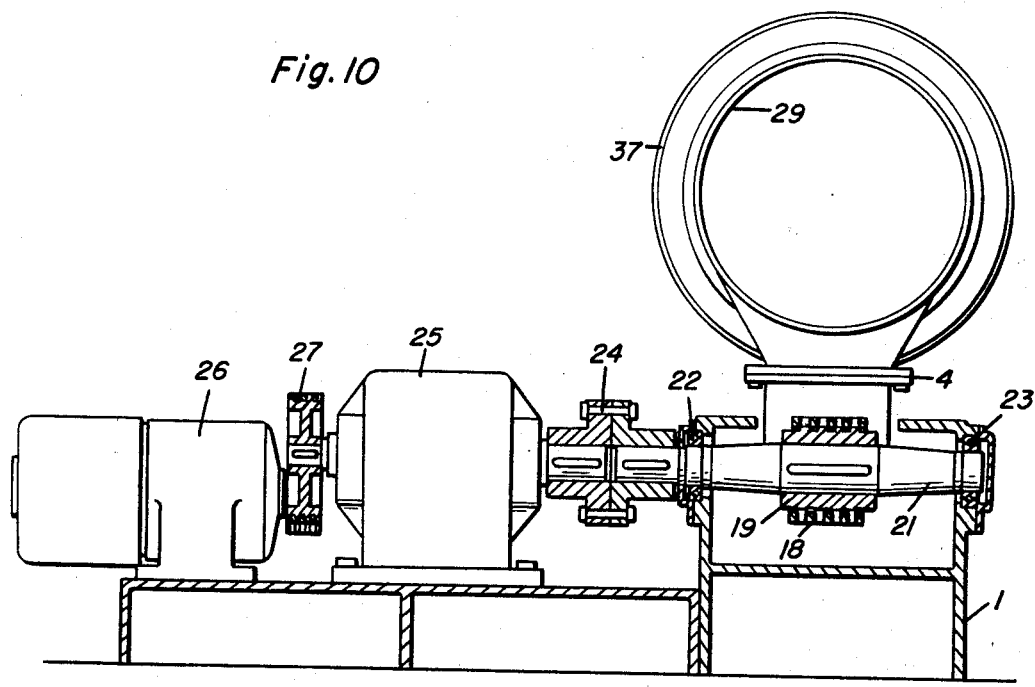
FIG. 10 is a cross section of the part of machine shown in FIG. 7b, taken along plane 10—10.
Figure 11:
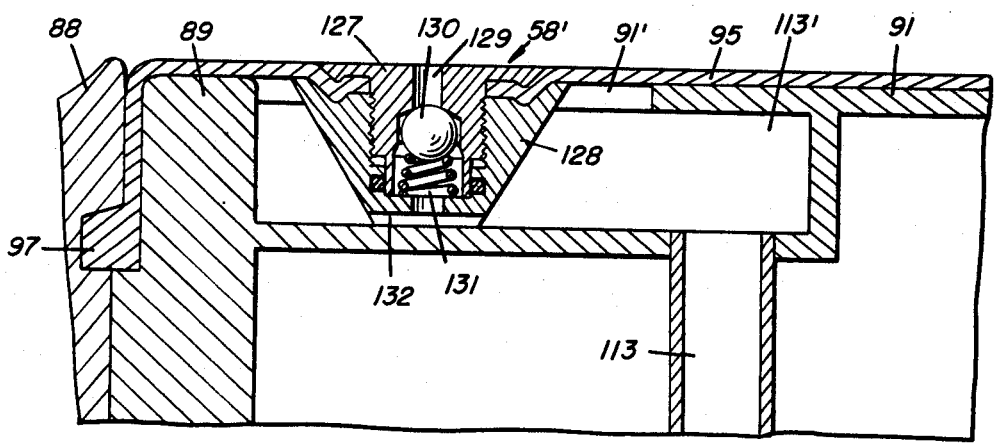
FIG. 11 is a detail, in section, of the non-removable rigid extension of one of the drum sides.

The machine shown in FIGS. 7-11 comprises a frame 1 to which are fastened rails 2, 3.

Two carriages 4 and 5, slidable in directions opposite to each other, are respectively assembled on rails 2, 3 by means of pairs of wheels 6, 7, 8, 9 and 10, 11, 12, 13, each having a horizontal axis, and of pairs of wheels 14, 15 and 16, 17, each having a vertical axis.

The carriages 4 and 5 are connected at their inner and outer ends to an endless chain 18 assembled on a sprocket wheel 19 and a transmission wheel 20. The sprocket wheel 19 is keyed on shaft 21, supported by the frame 1 by bearings 22 and 23 and connected by a joint 24 to a motor speed reducer 25 actuated by a reversible motor 26 through a belt transmission 27. The transmission wheel 20 is assembled on a shaft 28, also supported by the frame 1. Cylindrical supports 29 and 30 are respectively fixed on the carriages 4 and 5 and moreover are provided with a circumferential indentation or undercut on their respective inner surfaces. Onto the cylindrical supports there are rotatably assembled, by means of the ball bearings 31 and 32, bells 33 and 34 which are respectively provided on the periphery thereof with an annular band 35 and 36 and with a step 37, 38.

The frame 1 further carries a support 39, provided with a sleeve 40, which supports a double-acting cylinder 41, along the axis of which there is assembled, in cantilever fashion, a tube 42, one end of which is secured to the under portion 43 of the cylinder 41 and may alternatively be put into communication either with a container of variable capacity which has been previously filled with a prescribed volume of compressed air under a selected pressure, or with a device adapted to create a suction from the outside to the inside. The cylinder 41 is provided with apertures 44 and 45 for the injection and discharge of compressed fluid. The aperture 45 also passes through sleeve 40. A piston 46, having an axial bore and inserted on a tube 42, along which it may slide, is slidably assembled in the cylinder 41. At the end of the cylinder 41 opposite to the end provided with the aperture 44, a stop 47, to stop the piston 46 during its stroke to the right, is provided inside said cylinder. Integral with the piston 46 there is provided a hollow stem 48. Within the stem 48, at the end opposite to that of the piston 46, there is rotatably assembled, by means of taper roller bearings 49 and 50, a small shaft 51, provided with an axial bore 52, which extends beyond the vertical wall of a cap 53, keyed on the end of small shaft 51 which projects from the hollow stem 48. The bore 52 is connected to a duct 54, opening into a chamber 54' upwardly defined by the wall of a rigid cylinder 55, which is provided with a hole 55' and is integral with the cap 53. To the cap 53 is secured a rigid cylinder 56, having a diameter smaller than that of the cylinder 55. Between the inner flanges of the rigid cylinders 55 and 56 there is clamped the thickened edge portion 57 of a generally cylindrical membrane 58, provided with inextensible longitudinal reinforcements which, starting from edge 57, bears upon the cylinder 56, forms a loop outside this and then folds about itself and extends on the cylinder 55, at the free end of which there is clamped a thickened edge portion 59 by means of a ring 60.

The outer surface of ring 60 has a frusto-conical shape with diameters decreasing towards the free side, and its inner surface also has a frusto-conical shape, with increasing in diameter the same direction.

The difference between the diameter of the rigid cylinder 55 and that of the rigid cylinder 56 corresponds approximately to twice the thickness of the membrane 58. In an opening of the membrane there is tightly inserted the outermost portion of a valve 58', having a frusto-conical shape, the seat of which, also frusto-conical, is disposed in the chamber 54'.

On a frame 61, by means of bearing 62, there is assembled a hollow mandrel 63, at one end of which there is secured a disc 64, to which is fastened a ring 65 having a frusto-conical surface with decreasing in diameter from the face of disc 64 towards the outside. The frusto-conical surfaces of rings 60 and 65 are complementary. Between the disc 64 and the frusto-conical ring 65 there is clamped a thickened edge portion 66 of a tubular membrane 67, preferably provided with transverse grooves on its outer face. At the other end of the hollow mandrel 63 there is assembled, slidable in longitudinal direction by means of a key 68, a bushing 69 made fast with a pulley 70 by means of a key 71. The pulley 70, by means of a belt transmission 72, is connected to pulley 73, keyed on the shaft of a reversible motor 74. At its intermediate portion, mandrel 63, by means of thrust bearings 75, is connected to nut screws 76 and 77, which engage respectively with screw threaded portions 78 and 79 of doublethreaded shafts 80 and 81.

Externally and coaxially of the mandrel 63, a second hollow mandrel 83 is assembled in the frame 61, by bearings 82, so as to produce relative longitudinal sliding of the two mandrels, the second mandrel being however integral with the first during rotation by means of a key 84. To one end of the mandrel 83 there is secured a disc 85, provided with a sleeve 86, on which are assembled rings 87, 88 and 89, fastened to disc 85. A ring 88 is provided having an outer frusto-conical surface with increasing in diameter towards the mandrel 83. Between the disc 85 and ring 87 there is clamped a second thickened edge portion 90 of the tubular membrane 67. Integral with the ring 89 there is assembled a rigid cylinder 91, which carries at its other end an inner flange 92 to which there is secured an inner flange 93 of a rigid cylinder 94 of a diameter smaller than that of the cylinder 91. A tubular membrane 95, also provided with longitudinal inextensible reinforcements and having a thickened edge portion 96 clamped between flanges 92 and 93, bears upon the cylinder 94 and, after having formed a loop outside said cylinder, is bent upon itself, and bears upon rigid cylinder 91, and terminates with a thickened edge portion 97 clamped between the rings 88 and 89.

The difference of diameter between the rigid cylinder 94 and the cylinder 91 corresponds approximately to a double thickness of the membrane 95. At the end of the mandrel 83 opposite to that of the disc 85, mandrel 83 is connected, by means of thrust bearings 98, to nut screws 99 and 100 which engage respectively with screw threaded portions 101 and 102 of the shafts 80 and 81. The threads 101 and 102 correspond to the threads 78 and 79, but are effective in opposite directions. Tubes 103 and 104 are inserted inside the mandrel 63. The tube 103 may be connected at one end with a source of fluid under pressure by means of an intake 105, while at the other end it opens into a duct 106 communicating with the hole 107 which opens in the central inflatable part of the drum, that is in the space defined by the membrane 67. The tube 104, similarly to the tube 42, may be connected either to a second container of variable capacity, which has been previously filled with a prescribed volume of compressed air under a selected pressure, or with a device adapted to create a suction from the outside to the inside, by means of the intake 108, and is provided at the opposite end with ports 109 which open in interspace 110, connected through port 111 to interspace 112, from which tube 113 starts, which opens in the chamber 113' where another valve 58', encased in a frusto-conical seat, is provided. Chamber 113' communicates with the inner surface of the membrane 95 through opening 91', in the rigid cylindrical extension 91, through which the outermost part of the valve 58' extends, tightly inserted in an opening of the membrane 95.

Both valves 58' embody elements 127 and 128 (see FIG. 13) threadedly secured to each other and axially provided with a bore 129, of variable diameter, within which there is enclosed a ball 130 supported by a helical spring 131. Since the minimum diameter of the element 128 is greater than the minimum diameter of the frusto-conical seat of the valve, there is always a free passage 132 allowing the suction of air from the outside to the inside.

On the shafts 80 and 81 there are respectively keyed sprocket wheels 114 and 115, connected to each other and to sprocket wheel 116 by means of a chain 117. The sprocket wheel 116 is keyed on the shaft of a motor speed reducer 118, connected by means of a belt transmission 119 with reversible motor 120.

The operation of the machine will now be described with reference to the various manufacturing steps illustrated by FIGS. 1 to 6.

Carcass 121 is built up and stitched in a conventional way on rigid drum 122 of FIG. 1. Then, compressed fluid is injected through opening 45 to displace the piston 46 to the left and consequently the removable rigid extension of the left end wall of the drum, that is, the rigid cylinders 55 and 56 and the elements connected thereto. Rigid drum 122 is collapsed, the carcass 121 is removed from it, is transferred on to the central expansible part of the drum constituted by the discs 64 and 85 and by the membrane 67 and is inserted about this assembly (see FIG. 2). The cylinders 55 and 56 are approached to reconstitute the whole drum by discharging compressed fluid from opening 45 and by injecting fluid through opening 44 (see FIG. 3). The beads of the carcass are in this way supported by the rings 60 and 88. The duct 54, through the opening 52 and the tube 42, and the duct 113, through the interspace 112, port 111, the interspace 110, the ports 109, the tube 104 and the intake 108, are connected with a vacuum pump, in order to displace the balls 130 towards the inside and to create a suction from the outside to the inside adjacent the ports 129 of the valves 58', and the ends of the strips of the sidewalls 123 and 124 are secured to the openings of the ports 129 and are then wrapped a complete turn about membranes 58 and 95 to form a continuous ring.

Then, the connection of the ducts 54 and 113 with the vacuum pump is interrupted; the carcass is shaped (see FIG. 4) by reciprocally and symmetrically approaching the discs 64 and 85 and the bells 33 and 34 with respect to the drum midline, and at the same time by injecting compressed air inside the central part of the drum through the intake 105, the tube 103, the duct 106 and the port 107. The reciprocal approach of the discs 64 and 85 is carried out by actuating the motor 120 which, through the motor speed reducer 118, the transmission 119 and the sprocket wheels 116, 115 and 114 and the chain 117, imparts rotation to the shafts 80 and 81. The rotation of these shafts causes reciprocal outward displacement of the nut screws 99, 76 and 100, 77, thus causing longitudinal sliding in the opposite directions of the hollow mandrels 63 and 83, and then the reciprocal approach of the discs 64 and 85 to selected spaced positions. The cylinders 55 and 56 follow the displacement of the disc 64 of the central part of the drum, and the ring 60, integral with the cylinders, remains engaged on the ring 65 of the central part of the drum on account of the pressure exerted by the compressed fluid filling the cylinder 41. The reciprocal approach of the two bells 33 and 34 is obtained by actuating the motor 26 which, through the transmission 27, the motor speed reducer 25, the joint 24, the sprocket wheels 19 and 20 and the chain 18, causes the carriages 4 to 5 to slide along the rails 2 and 3.

The bells 33 and 34 are thus brought to a preestablished mutual distance so as to leave a space between their bands 35 and 36 (see FIG. 4). Then the motors 120 and 26 are stopped and the motor 74 is actuated. Motor 74, through the pulleys 73 and 70 and the belt transmission 72, imparts rotation to the mandrels 63 and 83, which are integral during rotation by reason of the key 84. The ring-shaped reinforcing structure 125 is wrapped between the steps 37 and 38 of the outer surface of the bells 33 and 34, which are dragged into rotation by friction from the underlying carcass, and this structure is stitched to the annular band of the carcass which appears between bells 33 and 34. Tread band 126 in the form of a strip is subsequently applied on the assembly. Both the ends of the reinforcing structure 125 and those of the tread band 126 are joined to one another.

At this stage bells 33 and 34 are spread apart by actuating the motor 26 in an opposite direction, until they reach a selected position in which they still surround a part of the lateral membranes, and both the reinforcing structure 125 and the tread band 126 are caused to adhere to the outer surface of the carcass 121 by means of an already known stitching device, not illustrated in the drawings, while the drum is maintained into rotation by means of the motor 74, which is subsequently stopped.

At this point, compressed air—the volume and the pressure of which have been previously adjusted in the two containers of variable capacity—is immediately and simultaneously injected between the membranes 58 and 95 and their corresponding rigid supports 55 and 91. The compressed air reaches the membrane 58 through the tube 42, the hole 52, the duct 54, the chamber 54' and the hole 55', and the membrane 95 through the intake 108, the tube 104, the ports 109, the interspace 110, the opening 111, the interspace 112, the duct 113, the chamber 113' and the hole 91'. The balls 130 of the valves 58' are pushed upwardly and prevent the passage of compressed air through port 129. The membranes 58 and 95 expand, thus causing the valves 58' to unseat, and partially engage the circumferential undercut provided in the inner surface of the cylindrical supports 29 and 30 of the bells 33 and 34 (see FIG. 5), while only the selected portion of membrane, necessary for the correct application of the sidewalls to the sides of the carcass when it attains the maximum selected diameter, is free to expand.

Then, as previously described (see FIGS. 5 and 6), the bells 33 and 34 are reciprocally and simultaneously approached by actuating the motor 26, in order to push the membranes 58 and 95 against the carcass and to stitch the sidewalls to the latter in a progressive manner, starting from the minimum diameter to the pre-established maximum diameter. To remove the finished tire from the expansible drum, the compressed fluid contained between the membrane 58 and the rigid cylinders 55 and 56, between the membrane 95 and the rigid cylinders 91 and 94, and in the inside of the expansible drum, is discharged, the bells 33 and 34 are spread apart by means of the motor 26 and the rigid cylinders 55 and 56 are detached from the expansible drum by means of the piston 46.

As may be deduced from the above description, the method forming the object of the present invention offers the following advantages:

(a) The manufacture of the carcass is very accurate; in fact, since it is carried out on a rigid drum the development of the carcass between the two beads may be maintained constant and closely in conformity with the required development; and, moreover, the carcasses obtained are compact and devoid of air occlusions by virtue of the efficient stitching of the plies against a rigid surface.

(b) Both the ring-shaped reinforcing structure and the tread band and the sidewalls may be accurately and expeditiously applied. In fact the use of the bells, whose outer diameter corresponds to the maximum diameter of the shaped carcass, ensures a true correspondence in the development of the ring-shaped reinforcing structure and of the tread band, which are wrapped in the form of strips on the facing rigid surfaces of said bells, as well as their true centering. Moreover, the adoption of rigid cylinders as extensions of the drum end members ensures a perfect correspondence in the development of the annular strips of the sidewalls. And the use of lateral membranes provided with longitudinal reinforcements, which prevent their elongation but allow their radial expansion, permits the strips of the sidewalls not to suffer any variation in their width during their application to the sides of the carcass, so that they may always reach in a symmetrical way and with the greatest precision the pre-established zone of maximum diameter at the sides of the carcass. Furthermore, the adoption of membranes provided with longitudinal reinforcements permits the inflation of said membranes, without the risk of blowouts, at a higher speed and with a fluid under a much higher pressure. Consequently, it is possible to obtain a considerable reduction in the manufacturing time and to exert, at the very beginning of the reciprocal approach of the bells, a strong pressure in correspondence of the beads so as to avoid prejudicial air occlusions between the carcass and the sidewalls just in the most delicate portion of the tire. While the bells are approached, the membranes are progressively pushed against the carcass sides at still increasing diameters and under a still higher pressure. Therefore, also in the intermediate portion, air occlusions cannot take place and the conventional stitching of the sidewalls is no longer necessary, with the result of a remarkable saving of time and power.

(c) The operation of fastening, by suction, one end of the strips of the sidewalls in correct position on the lateral membranes cooperates in ensuring true symmetry of the sidewalls with respect to the mid-circumferential plane of the finished tire.

As regards the machine, the fact that one of the lateral extensions of the drum end walls may be axially displaced and that one of the rings which have a frusto-conical profile and serve to support the carcass beads, is integral with said extension, facilitates both the insertion of the cylindrical carcass about the drum and the removal of the finished tire therefrom, with a considerable saving of time, since it is not necessary to ovalize the bead core of one of the beads. On the other hand, the frusto-conical surfaces upon which the carcass beads bear cooperate in maintaining the beads in place even during the shaping of the carcass, since they tend to prevent the beads from being detached from their seats during this operation.

In addition, the utilization of two lateral membranes whose longitudinal development is remarkably greater than the prescribed distance existing between their clamped edges, and the presence of the rigid cylindrical supports of the bells, provided on their inner surface with circumferential undercuts, permit the choice of the most suitable development of the membrane, although such membrane may always be used, for the application of the corresponding sidewall. In fact a different portion of the lateral membranes may be engaged in these undercuts according to the position of the supports of the bells when the membranes are inflated, and therefore relative sliding between the portion of membrane engaged in the undercuts and the corresponding support of the bell is not possible.

The chain drive for the control of the displacements of the bells, besides ensuring a true symmetry of said displacements, permits a number of operations greater than that it is possible to carry out by means of the double-acting cylinders described in United States Patent No. 2,814,330 which on the other hand are necessary, since the bells are used not only for the application of the ring-shaped reinforcing structures and of the tread, but also for the application of the sidewalls to the carcass. For this latter operation it is indispensable that the bells assume a series of different positions according to the diameter of the carcass, onto which the sidewalls are to be applied.

The provision of transverse knurls on the outer surface of the central membrane of the drum permits, during the shaping of the carcass, corresponding knurls to be imparted on the inner surface of the latter, thus facilitating the expulsion of the air which remains trapped between the inner surface of the tire to be cured and the outer surface of the curing bag during the introduction of this in the tire before the curing operation.

With respect to the machine described in the United States Patent No. 3,053,308, the machine forming the object of the present application is remarkably simplified owing to the elimination of the shaft which supported the two mandrels and which was also used for the injection of the compressed fluid for the inflation of the three expansible portions tightly separated from one another, with a consequent economical advantage.

Finally, the interposition of the roller bearings between the bells and their cylindrical supports results in a saving of power, as it is not necessary to also impart rotation to the mass constituted by the supports.

What is claimed is:

1. A method of manufacturing pneumatic tires comprising the steps of forming a carcass on a flat rigid drum, transferring said carcass to an expansible central portion of a second drum, shaping said carcass into a toroidal form on said second drum, then wrapping an inextensible reinforcing structure and a tread band on the mid-circumferential portion of said carcass, and then applying a sidewall strip to each side of said carcass.

2. A method of manufacturing pneumatic tires having substantially inextensible elements, comprising the steps of forming a carcass in toroidal form on the central portion of a drum, applying a reinforcing structure and a tread band to said carcass, positioning two lateral drum portions to either side of said central drum portion, applying expansible membranes having longitudinally inextensible reinforcing members therein over each of said lateral drum portions, applying a sidewall strip in the form of a ring over each of said membranes, radially expanding said membranes, and compressing said membranes axially towards the drum midline to apply said sidewall strips to the sides of said carcass.

3. The method of claim 1, wherein said reinforcing structure and said tread band are wrapped in the form of a strip about said carcass and the ends of said strip are joined to one another.

4. The method of claim 2, wherein said reinforcing structure and said tread band are applied on said mid-circumferential portion of said carcass by superposing their lateral portions to two rigid and rotatable auxiliary bells.

5. The method of claim 4, wherein said step of compressing is achieved by approaching said bells to the drum midline, at least a portion of each of said membranes extending within a corresponding bell.

6. The method of claim 5, wherein said bells are movable independently of said membranes.

7. The method of claim 2, wherein said sidewall strips are applied to the sides of said carcass by starting from the smaller diameter of said carcass and progressing to the larger diameter thereof.

8. The method of claim 2, further comprising the step of removing one of said lateral drum portions from the side of said central drum portion to permit transfer of said carcass to and from said central drum portion.

9. The method of claim 2, wherein in the application of said sidewall strips to said carcass, said membranes are initially inflated with a predetermined volume of fluid under a predetermined pressure so that a portion of each of said membranes engages against a rigid cylindrical surface having a diameter smaller than the maximum diameter of the shaped carcass, after which the other portion of each of said membranes is pressed axially against the side of the tire by means of rigid bells which are integral with said rigid cylindrical surfaces.

10. The method of claim 9, according to which the volume of compressed fluid which is injected in each of said membranes to expand it is previously adjusted separately in a container of variable capacity under a predetermined pressure.

11. The method of claim 2, wherein said sidewall strips are applied over said membranes by the steps of securing said strips in correct position on their corresponding membrane by virtue of a suction exerted from the inside of said membranes, and wrapping said strips a complete turn about said membranes so as to constitute a continuous ring, the suction being interrupted after the formation of said ring.

12. A machine for manufacturing pneumatic tires having substantially inextensible elements, comprising a central drum portion having a carcass in toroidal form with a reinforcing structure and a tread band adhered thereto applied thereon, two lateral drum portions extending to either side of said central drum portion, an expansible membrane having longitudinally inextensible reinforcing members therein extending over each of said lateral drum portions, each of said membranes being adapted to receive a sidewall strip in the form of a ring which extends over said membranes, means to radially expand said membranes, and means to compress said membranes axially towards the drum midline to apply said sidewall strips to the sides of said carcass.

13. A machine as in claim 12, wherein said central drum portion comprises end members adapted to be reciprocally and symmetrically displaced in two directions relative the midline of said central drum portion, an expansible central tubular membrane disposed between said end members with its end portions respectively tightly secured to the adjacent one of said end members, and means for injecting and discharging compressed fluid to and from the inside of said membrane.

14. A machine as in claim 13, wherein said lateral drum portions are in the form of rigid cylindrical members forming lateral extensions of said end members, said lateral membranes being coaxially mounted on said rigid cylindrical members with their end portions tightly secured to same.

15. A machine as in claim 14, wherein one of said rigid cylindrical members is axially displaceable relative to the other components of said central drum portion.

16. A machine as in claim 14, further comprising two rigid cylindrical supports coaxial with said central drum portion and each adapted to be reciprocally approached and spread apart independently of the adjacent one of said end members, and a bell rotatably mounted on each support and having an outer diameter corresponding to the maximum outer diameter of the shaped carcass.

17. A machine as in claim 16, further comprising means for displacing said end members symmetrically in the opposite directions with respect to the drum midline, means for simultaneously rotating said end members together about their respective axes, means for injecting and discharging compressed fluid inside said central tubular membrane, means for injecting and discharging compressed fluid between the outer surfaces of said rigid cylindrical members and said lateral membranes, means for axially engaging and disengaging said axially displaceable rigid cylindrical member from said central drum portion, and means for symmetrically displacing said rigid cylindrical supports with respect to said central drum portion.

18. A machine as in claim 16, wherein said bells are movable independently of said membranes.

19. A machine as in claim 13, wherein the diameter corresponding to the circumferences along which said end portions of said central tubular membrane are clamped is smaller than the diameter of said lateral drum portions.

20. A machine as in claim 12, wherein said lateral drum portions are each constituted by two coaxial rigid cylindrical members having a different diameter, the difference between the two diameters being approximately two times the thickness of the lateral membrane superposed to them.

21. A machine as in claim 20, wherein one edge of each of said lateral membranes is clamped between inner contiguous flanges of said rigid cylindrical members and the other edge is clamped at the end of said rigid cylindrical member of greater diameter opposite to the end of said flanges.

22. A machine as in claim 20, wherein each of said lateral membranes bears directly upon the rigid cylindrical member of smaller diameter, is bent upon itself after having formed a loop without support, and then bears upon the rigid cylindrical member of greater diameter.

23. A machine as in claim 20, wherein the end of each of said lateral drum portions adjacent said central drum portion has a tapered peripheral surface, the maximum diameter of which corresponds to the maximum diameter of the corresponding rigid cylindrical member of greater diameter, and the minimum diameter of which corresponds to the diameter of the circumference about which thickened edges of said central membrane are clamped.

24. A machine as in claim 15, wherein the end member which corresponds to said axially displaceable rigid cylindrical member is provided with a tapered surface decreasing in diameter towards the outside, and said axially displaceable rigid cylindrical member is provided on its inwardly disposed end with a ring having a tapered surface increasing in diameter towards the adjacent end member, said tapered surfaces being complementary.

25. A machine as in claim 12, wherein said lateral membranes are provided, in proximity to the adjacent end wall of said central drum portion, with an opening tightly receiving a valve, and means to cause a sucking action through said valve from the outside to the inside during the application of the strips of the sidewalls about said lateral membranes.

26. A machine as in claim 17, further comprising a chamber intermediate said means for injecting and discharging compressed fluid between the outer surface of lateral drum portions and said lateral membranes, said chamber being provided with a frusto conical seat for a frusto conical valve, the smaller diameter of said valve being greater than the smaller diameter of its seat, said valve protruding beyond a port in one of said lateral drum portions and being of a diameter greater than the maximum diameter of the valve, in correspondence of which the valve is tightly fastened in an opening provided in each of said lateral membranes, and means to create vacuum in said chamber during the application of said sidewall strips about said lateral membranes.

27. A machine as in claim 14, wherein each of said end members is supported by a hollow mandrel, said mandrels being coaxial and reciprocally slidable telescopically in a longitudinal direction but being integral with each other during rotation, a pair of tubes adapted to be connected, independently of each other, with a source of compressed fluid, one of said tubes adapted to be alternatively connected with means suitable to create a vacuum, said one of said tubes being provided inside the mandrel of smaller diameter, a peripheral hollow space being formed which may be connected by means of holes both with the inside of said one of said tubes and with a second outermost hollow space communicating with a duct passing through the wall of the mandrel of greater diameter and opening in a chamber interposed between said duct and the undetachable one of said rigid cylinders, said chamber being provided with a frusto conical seat for a valve which protrudes through a hole obtained in said undetachable cylinder and which is tightly fastened in an opening in the tubular membrane associated with the latter, said one tube extending in a duct which, through a hole obtained in this latter mandrel, is connected with the inside of said central drum portion.

28. A machine as in claim 15, wherein said axially displaceable rigid cylindrical member is keyed on a small shaft rotatably assembled in a hollow stem connected to a piston slidable in a double-acting cylinder, said small shaft having an axial bore.

29. A machine as in claim 28, wherein said double-acting cylinder is provided with an inner axial tube along which the piston slides, said piston being provided with a corresponding axial hole and wherein said tube, adjacent one end, is adapted to be selectively connected with a source of compressed fluid, and with means for creating a suction from the outside to the inside, the other end of said tube being connected with the inside of said hollow stem, the axial bore of said small shaft also being connected with a duct opening into a chamber interposed between said duct and said displaceable rigid cylindrical member, said chamber being provided with a frusto conical seat for a valve, extending through a hole in said displaceable rigid cylindrical member, being tightly fastened in an opening in the tubular membrane associated with said displaceable rigid cylinder.

30. A machine as in claim 16, in which the inner surface of each of said rigid cylindrical supports is provided with a circumferential undercut adapted to firmly engage its corresponding lateral membrane in inflated condition.

31. A method of manufacturing pneumatic tires, embodying substantially inextensible elements, according to which the carcass is shaped in a cylindrical form and is stitched on a rigid drum, then it is transferred on a second drum the central part of which is expansible and the lateral parts of which are radially expansible but longitudinally inextensible, and is brought to a toroidal shape by means of the corresponding deformation of the central part of the second drum, a ring-shaped reinforcing structure and the tread are applied on the mid-circumferential portion of the carcass by superposing their lateral parts to two rigid and rotatable auxiliary bells, the outer diameter of which corresponds to the greatest outer diameter of the shaped carcass, the rigid bells are removed, the reinforcing structure and the tread band are caused to adhere completely to the shaped carcass, the strips of the sidewalls, in the form of rings, are applied on the lateral expansible parts of the second drum by initially securing one end of the strips of the sidewalls in correct position on the corresponding expansible lateral part of the second drum by virtue of a suction exerted from the inside of said part, and then wrapping said strips a complete turn about the lateral parts of the second drum so as to constitute a continuous ring, the suction being interrupted after the formation of said ring, and then simultaneously and symmetrically reversing said strips on the sides of the shaped carcass, the width of said strips being maintained constant, by progressively starting from the minimum diameter to the pre-established maximum diameter by virtue of the expansion of the lateral parts of the second drum and of their compression in an axial direction towards the drum midline.

32. A machine for shaping a cylindrical carcass of pneumatic tires and for the application on the carcass of other component elements of the tire comprising a building drum having end members adapted to be reciprocally and symmetrically approached and spread apart relative the midline of the drum, an expansible tubular membrane disposed between said end members with its end portions respectively tightly secured to the adjacent one of said end members, said membrane constituting a central membrane of the machine, said end members each having a lateral extension in the form of a rigid cylinder, second and third tubular membranes radially expansible but longitudinally inextensible respectively coaxially mounted on said cylinders and with their end portions tightly secured to the same, one of said cylinders being axially displaceable relative to the other elements of said building drum, two rigid cylindrical supports coaxial with said drum and each adapted to be reciprocally approached and spread apart independently of the adjacent one of said end members, a bell rotatably mounted on each support and having an outer diameter corresponding to the maximum outer diameter of the shaped carcass, means for displacing said end members symmetrically in the opposite directions with respect to the drum midline, means for simultaneously rotating said end members together about their respective axes, means for injecting and discharging compressed fluid inside said central tubular membrane, means for injecting and discharging compressed fluid between the outer surfaces of said rigid extensions and said second and third membranes, means for axially engaging and disengaging said axially displaceable cylinder from the building drum, and means for symmetrically displacing the cylindrical supports of the bells with respect to the drum midline, said second and third tubular membranes being provided, in proximity to the adjacent end wall of said drum, with an opening tightly receiving a valve, and means to cause a sucking action through said valve from the outside to the inside during the application of the strips of the sidewalls about said membranes.

33. A machine for shaping a cylindrical carcass of pneumatic tires and for the application on the carcass of other component elements of the tire comprising a building drum having end members adapted to be reciprocally and symmetrically approached and spread apart relative the midline of the drum, an expansible tubular membrane disposed between said end members with its end portions respectively tightly secured to the adjacent one of said end members, said membrane constituting a central membrane of the machine, said end members each having a lateral extension in the form of a rigid cylinder, second and third tubular membranes radially expansible but longitudinally inextensible respectively coaxially mounted on said cylinders and with their end portions tightly secured to the same, one of said cylinders being axially displaceable relative to the other elements of said building drum, two rigid cylindrical supports coaxial with said drum and each adapted to be reciprocally approached and spread apart independently of the adjacent one of said end members, a bell rotatably mounted on each support and having an outer diameter corresponding to the maximum outer diameter of the shaped carcass, means for displacing said end members symmetrically in the opposite directions with respect to the drum midline, means for simultaneously rotating said end members together about their respective axes, means for injecting and discharging compressed fluid inside said central tubular membrane, means for injecting and discharging compressed fluid between the outer surface of said rigid extensions and said second and third membranes, means for axially engaging and disengaging said axially displaceable cylinder from the building drum, means for symmetrically displacing the cylindrical supports of the bells with respect to the drum midline, a chamber intermediate the means for injecting and discharging compressed fluid between the outer surface of each rigid cylinder and the adjacent one of said second and third tubular membranes, said chamber being provided with a frusto conical seat for a frusto conical valve, the smaller diameter of said valve being greater than the smaller diameter of its seat, said valve protruding beyond a port, in said rigid cylinder and being of a diameter greater than the maximum diameter of the valve, in correspondence of which the valve is tightly fastened in an opening provided in each of said last recited membranes, and means to create vacuum in said chamber during the application of the strips of the sidewalls about said membranes.

34. A machine for shaping a cylindrical carcass of pneumatic tires and for the application on the carcass of other component elements of the tire comprising a building drum having end members adapted to be reciprocally and symmetrically approached and spread apart relative the midline of the drum, an expansible tubular membrane disposed between said end members with its end portions respectively tightly secured to the adjacent one of said end members, said membrane constituting a central membrane of the machine, said end members each having a lateral extension in the form of a rigid cylinder, second and third tubular membranes radially expansible but longitudinally inextensible respectively coaxially mounted on said cylinders and with their end portions tightly secured to the same, one of said cylinders being axially displaceable relative to the other elements of said building drum, two rigid cylindrical supports coaxial with said drum and each adapted to be reciprocally approached and spread apart independently of the adjacent one of said end members, a bell rotatably mounted on each support and having an outer diameter corresponding to the maximum outer diameter of the shaped carcass, means for displacing said end members symmetrically in the opposite directions with respect to the drum midline, means for simultaneously rotating said end members together about their respective axes, means for injecting and discharging compressed fluid inside said central tubular membrane, means for injecting and discharging compressed fluid between the outer surfaces of said rigid extensions and said second and third membranes, means for axially engaging and disengaging said axially displaceable cylinder from the building drum, means for symmetrically displacing the cylindrical supports of the bells with respect to the drum midline, each of said end members being supported by a hollow mandrel, said mandrels being coaxial and reciprocally slidable telescopically in a longitudinal direction but being integral with each other during rotation, and a pair of tubes adapted to be connected, independently of each other, with a source of compressed fluid and one of which, alternatively, with means suitable to create vacuum, being provided inside the mandrel of smaller diameter, wherein there is also provided a peripheral hollow space which may be connected by means of holes both with the inside of the second of said tubes and with a second outermost hollow space communicating with a duct passing through the wall of the mandrel of greater diameter and opening in a chamber interposed between said duct and the undetachable one of said rigid cylinders, said chamber being provided with a frusto conical seat for a valve which protrudes through a hole obtained in said undetachable cylinder and is tightly fastened in an opening in the tubular membrane associated with the latter, while the second tube disposed in the mandrel of smaller diameter extends in a duct which, through a hole obtained in this latter mandrel, is connected with the inside of the expansible drum.

35. A machine for shaping a cylindrical carcass of pneumatic tires and for the application on the carcass of other component elements of the tire comprising a building drum having end members adapted to be reciprocally and symmetrically approached and spread apart relative the midline of the drum, an expansible tubular membrane disposed between said end members with its end portions respectively tightly secured to the adjacent one of said end members, said membrane constituting a central membrane of the machine, said end members each having a lateral extension in the form of a rigid cylinder, second and third tubular membranes radially expansible but longitudinally inextensible respectively coaxially mounted on said cylinders and with their end portions tightly secured to the same, one of said cylinders being axially displaceable relative to the other elements of said building drum, two rigid cylindrical supports coaxial with said drum and each adapted to be reciprocally approached and spread apart independently of the adjacent one of said end members, a bell rotatably mounted on each support and having an outer diameter corresponding to the maximum outer diameter of the shaped carcass, means for displacing said end members symmetrically in the opposite directions with respect to the drum midline, means for simultaneously rotating said end members together about their respective axes, means for injecting and discharging compressed fluid inside said central tubular membrane, means for injecting and discharging compressed fluid between the outer surfaces of said rigid extensions and said second and third membranes, means for axially engaging and disengaging said axially displaceable cylinder from the building drum, and means for symmetrically displacing the cylindrical supports of the bells with respect to the drum midline, said axially displaceable cylinder being keyed on a small shaft rotatably assembled in a hollow stem connected to a piston slidable in a double-acting cylinder, said small shaft having an axial bore.

36. A machine as in claim 15, in which the double-acting cylinder is provided with an inner axial tube along which the piston slides, the piston being provided with a corresponding axial hole and the tube, adjacent one end, being connected either with a source of compressed fluid, or with means for creating a depression from the outside to the inside, the other end of said tube always being connected with the inside of the hollow stem, the axial bore of said small shaft also being connected with a duct opening into a chamber interposed between said duct and said displaceable cylinder, said chamber being provided with a frusto-conical seat for a valve extending through a hole in said displaceable cylinder and is tightly fastened in an opening in the tubular membrane associated with the last recited cylinder.

References Cited

UNITED STATES PATENTS

| | | | |
|---|---|---|---|
| 1,869,656 | 8/1932 | Black | 156—415 |
| 2,814,330 | 11/1957 | Vanzo et al. | 156—410 |
| 2,878,856 | 3/1959 | Pacciarini et al. | 156—400 |
| 3,016,084 | 1/1962 | Niclas et al. | 156—123 |
| 3,047,450 | 7/1962 | Drakeford et al. | 156—415 X |
| 3,111,444 | 11/1963 | Pouilloux | 156—416 |
| 3,138,510 | 6/1964 | Hindin et al. | 156—123 X |
| 3,188,260 | 6/1965 | Nebout | 156—416 X |
| 3,265,549 | 8/1966 | Woodhall et al. | 156—416 X |
| 3,171,769 | 3/1965 | Henley et al. | 156—416 X |

EARL M. BERGERT, *Primary Examiner.*

C. B. COSBY, *Examiner.*

UNITED STATES PATENT OFFICE
CERTIFICATE OF CORRECTION

Patent No. 3,409,490                                           November 5, 1968

Antonio Pacciarini et al

It is certified that error appears in the above identified patent and that said Letters Patent are hereby corrected as shown below:

Column 6, line 35, "to", first occurrence, should read -- and --.
Column 14, line 45, claim reference numeral "15" should read -- 35 --.

Signed and sealed this 3rd day of March 1970.

(SEAL)
Attest:

Edward M. Fletcher, Jr.                      WILLIAM E. SCHUYLER, JR.
Attesting Officer                                  Commissioner of Patents